(12) United States Patent
Novick et al.

(10) Patent No.: US 10,630,633 B2
(45) Date of Patent: Apr. 21, 2020

(54) REAL-TIME COLLECTION, ANALYSIS AND PRESENTATION OF AGGREGATED SELECTION DATA BY USERS OF SOCIAL MEDIA

(71) Applicant: Advance Local Media LLC, New York, NY (US)

(72) Inventors: Harris Novick, Woodside, NY (US); Kevin Wong, Robbinsville, NJ (US); David Cohn, Berkeley, CA (US); Lawrence Donoghue, Brooklyn, NY (US)

(73) Assignee: Advance Local Media LLC, New York, NY (US)

( * ) Notice: Subject to any disclaimer, the term of this patent is extended or adjusted under 35 U.S.C. 154(b) by 307 days.

(21) Appl. No.: 15/481,528

(22) Filed: Apr. 7, 2017

(65) Prior Publication Data
US 2017/0295126 A1 Oct. 12, 2017

Related U.S. Application Data

(60) Provisional application No. 62/320,996, filed on Apr. 11, 2016.

(51) Int. Cl.
| | |
|---|---|
| *G06F 15/16* | (2006.01) |
| *H04L 12/58* | (2006.01) |
| *H04L 29/08* | (2006.01) |
| *H04L 29/06* | (2006.01) |

(52) U.S. Cl.
CPC ............ *H04L 51/32* (2013.01); *H04L 51/046* (2013.01); *H04L 51/16* (2013.01); *H04L 67/22* (2013.01); *H04L 65/60* (2013.01)

(58) Field of Classification Search
CPC ....... H04L 51/32; H04L 51/046; H04L 51/16; H04L 67/22; H04L 65/60
USPC ................................ 709/204, 205, 206, 207
See application file for complete search history.

(56) References Cited

U.S. PATENT DOCUMENTS

| | | | |
|---|---|---|---|
| 8,825,515 B1 * | 9/2014 | Hanson | G06Q 50/01 705/7.32 |
| 9,733,698 B1 * | 8/2017 | Schmitz | G06Q 50/01 |
| 2012/0059690 A1 * | 3/2012 | Ruckart | G06Q 30/0207 705/14.1 |

(Continued)

*Primary Examiner* — Liang Che A Wang
(74) *Attorney, Agent, or Firm* — Withrow & Terranova, PLLC (57) ABSTRACT

An article articulating two different points of view is provided to a reader, with each point of view associated with a respective hashtag. Social media streams associated with social media outlets are also collected and analyzed to identify occurrences of the hashtags in the social media streams, and to collect and analyze information relating to those occurrences. Scoring parameter values are assigned to each occurrence, with each scoring parameter value based on the related information, such as an identity of a notable social media user associated with the occurrence. A weighted score value is generated based on the scoring parameter values for each hashtag, and the weighted score value is presented to the reader of the article in real time. Additional visual information, such as trend lines, identities of notable social media users associated with certain occurrences, and other information may also be provided to the reader in real time.

21 Claims, 9 Drawing Sheets

(56) References Cited

U.S. PATENT DOCUMENTS

| | | | |
|---|---|---|---|
| 2014/0215508 A1* | 7/2014 | Wyatt | H04N 21/4758 |
| | | | 725/24 |
| 2016/0224686 A1* | 8/2016 | Ramanathan | G06F 16/951 |
| 2016/0371709 A1* | 12/2016 | Browning | G06F 16/285 |
| 2016/0381204 A1* | 12/2016 | Chandrasekaran | ............... |
| | | | H04M 1/72569 |
| | | | 715/745 |

* cited by examiner

```
                                  100
                                      ↘

┌─────────────────────────────────────────────────────────────────┐
    │  PROVIDING ACCESS TO AN ARTICLE ARTICULATING A FIRST POINT OF   │
    │  VIEW AND A SECOND POINT OF VIEW, THE ARTICLE INCLUDING A FIRST │
    │  HASHTAG ASSOCIATED WITH THE FIRST POINT OF VIEW AND A SECOND   │
    │  HASHTAG ASSOCIATED WITH THE SECOND POINT OF VIEW               │
    │                                                             102 │
    └─────────────────────────────────────────────────────────────────┘
                                      │
                                      ▼
    ┌─────────────────────────────────────────────────────────────────┐
    │  INTERFACING WITH A PLURALITY OF SOCIAL MEDIA OUTLETS TO RECEIVE│
    │  A CORRESPONDING PLURALITY OF SOCIAL MEDIA STREAMS OF CONTENT   │
    │  ASSOCIATED WITH THE PLURALITY OF SOCIAL MEDIA OUTLETS          │
    │                                                             104 │
    └─────────────────────────────────────────────────────────────────┘
                                      │
                                      ▼
    ┌─────────────────────────────────────────────────────────────────┐
    │  PROCESSING THE PLURALITY OF SOCIAL MEDIA STREAMS TO            │
    │  IDENTIFY A PLURALITY OF OCCURRENCES OF THE FIRST HASHTAG       │
    │  OR THE SECOND HASHTAG CONTAINED IN THE                         │
    │  PLURALITY OF SOCIAL MEDIA STREAMS                              │
    │                                                             106 │
    └─────────────────────────────────────────────────────────────────┘
                                      │
                                      ▼
    ┌─────────────────────────────────────────────────────────────────┐
    │  DETERMINING A SCORING PARAMETER VALUE FOR EACH                 │
    │  OCCURRENCE OF THE PLURALITY OF OCCURRENCES                     │
    │                                                             108 │
    └─────────────────────────────────────────────────────────────────┘
                                      │
                                      ▼
    ┌─────────────────────────────────────────────────────────────────┐
    │  GENERATING A WEIGHTED SCORE VALUE OF THE FIRST HASHTAG OR      │
    │  THE SECOND HASHTAG CONTAINED IN THE PLURALITY OF SOCIAL        │
    │  MEDIA STREAMS BASED ON THE PLURALITY OF SCORING                │
    │  PARAMETER VALUES FOR THE PLURALITY OF OCCURRENCES              │
    │                                                             110 │
    └─────────────────────────────────────────────────────────────────┘
                                      │
                                      ▼
    ┌─────────────────────────────────────────────────────────────────┐
    │  EFFECTING PRESENTATION OF INFORMATION IDENTIFYING              │
    │  THE WEIGHTED SCORE VALUE OF THE FIRST HASHTAG                  │
    │  OR THE SECOND HASHTAG                                          │
    │                                                             112 │
    └─────────────────────────────────────────────────────────────────┘
```

FIG. 5B

REAL-TIME COLLECTION, ANALYSIS AND PRESENTATION OF AGGREGATED SELECTION DATA BY USERS OF SOCIAL MEDIA This application claims the benefit of U.S. Provisional Application No. 62/320,996, filed on Apr. 11, 2016, entitled "REAL-TIME DISCOVERY, ANALYSIS AND PRESENTATION OF PERSPECTIVES OF AN ARTICLE," the disclosure of which is hereby incorporated herein by reference in its entirety.

TECHNICAL FIELD

Embodiments relate to selection data by users of social media and, more particularly, to real-time collection, analysis, and presentation of aggregated selection data by users of social media.

BACKGROUND

Social media provides valuable information and insight into the preferences and opinions of consumers of digital media. For many social media outlets, such as Facebook®, Twitter®, etc., a social media application program interface (API) can enable access to social media streams including text, photos, video, GIFs, polls, live video, hashtags, and/or links to outside content, for example. This content is generally created by some or all users on these platforms to share with their social connections and/or the public. The social media APIs that are made available by many social media outlets therefore provide real-time streaming access to this content, but existing social media APIs do not provide a way to analyze the user-generated content that streams through them in real time.

SUMMARY

Embodiments relate to selection data by users of social media and, more particularly, to real-time collection, analysis, and presentation of aggregated selection data by users of social media. In one embodiment, an article articulating two different points of view is provided to a reader, with each point of view associated with a respective hashtag. Social media streams associated with social media outlets are also collected and analyzed to identify occurrences of the hashtags in the social media streams, and to collect and analyze information relating to those occurrences. Scoring parameter values are assigned to each occurrence, with each scoring parameter value based on the related information, such as an identity of a notable social media user associated with the occurrence. A weighted score value is generated based on the scoring parameter values for each hashtag, and the weighted score value is presented to the reader of the article in real time. Additional visual information, such as trend lines, identities of notable social media users associated with certain occurrences, and other information may also be provided to the reader in real time.

According to one embodiment, a method is disclosed. The method includes providing, by a computing device, access to an article articulating a first point of view and a second point of view, the article including a first hashtag associated with the first point of view and a second hashtag associated with the second point of view. The method further includes interfacing with a plurality of social media outlets to receive a corresponding plurality of social media streams of content associated with the plurality of social media outlets. The method further includes processing, by the computing device, the plurality of social media streams to identify a plurality of occurrences of the first hashtag or the second hashtag contained in the plurality of social media streams. The method further includes determining, by the computing device, a scoring parameter value for each occurrence of the plurality of occurrences. The method further includes generating, by the computing device, a weighted score value of the first hashtag or the second hashtag contained in the plurality of social media streams based on the plurality of scoring parameter values for the plurality of occurrences. The method further includes effecting presentation of, on a display device, information identifying the weighted score value of the first hashtag or the second hashtag.

According to another embodiment, a computing device is disclosed. The computing device comprises a communications interface configured to communicate with a network. The computing device further comprises a processor device coupled to the communications interface. The processor device is configured to provide access to an article articulating a first point of view and a second point of view, the article including a first hashtag associated with the first point of view and a second hashtag associated with the second point of view. The processor device is further configured to interface with a plurality of social media outlets to receive a corresponding plurality of social media streams of content associated with the plurality of social media outlets. The processor device is further configured to process the plurality of social media streams to identify a plurality of occurrences of the first hashtag or the second hashtag contained in the plurality of social media streams. The processor device is further configured to determine a scoring parameter value for each occurrence of the plurality of occurrences. The processor device is further configured to generate a weighted score value of the first hashtag or the second hashtag contained in the plurality of social media streams based on the plurality of scoring parameter values for the plurality of occurrences. The processor device is further configured to effect presentation of, on a display device, information identifying the weighted score value of the first hashtag or the second hashtag.

According to another embodiment, a non-transitory computer readable medium is disclosed. The non-transitory computer readable medium comprises machine readable instructions configured to cause a processor device to provide access to an article articulating a first point of view and a second point of view, the article including a first hashtag associated with the first point of view and a second hashtag associated with the second point of view. The machine readable instructions are further configured to cause a processor device to interface with a plurality of social media outlets to receive a corresponding plurality of social media streams of content associated with the plurality of social media outlets. The machine readable instructions are further configured to cause a processor to process the plurality of social media streams to identify a plurality of occurrences of the first hashtag or the second hashtag contained in the plurality of social media streams. The machine readable instructions are further configured to cause a processor to determine a scoring parameter value for each occurrence of the plurality of occurrences. The machine readable instructions are further configured to cause a processor to generate a weighted score value of the first hashtag or the second hashtag contained in the plurality of social media streams based on the plurality of scoring parameter values for the plurality of occurrences. The machine readable instructions are further configured to cause a processor to effect presentation of, on a display device, information identifying the weighted score value of the first hashtag or the second hashtag.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first hashtag" and "second hashtag," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified.

Embodiments relate to selection data by users of social media and, more particularly, to real-time collection, analysis, and presentation of aggregated selection data by users of social media. In one embodiment, access to an article articulating two different points of view is provided to a reader, with each point of view associated with a respective hashtag. Social media streams associated with social media outlets are also collected and analyzed to identify occurrences of the hashtags in the social media streams, and to collect and analyze information relating to those occurrences. Scoring parameter values are assigned to each occurrence, with each scoring parameter value based on the collected information. The scoring parameter value may be a tally of an occurrence, or other information related to the occurrence, such as an identity of a notable social media user associated with the occurrence. A weighted score value is generated based on the aggregated scoring parameter values for each hashtag, and the weighted score value is presented to the reader of the article in real time. Additional visual information, such as trend lines, identities of notable social media users associated with certain occurrences, and other information may also be provided to the reader in real time.

Figure 1:
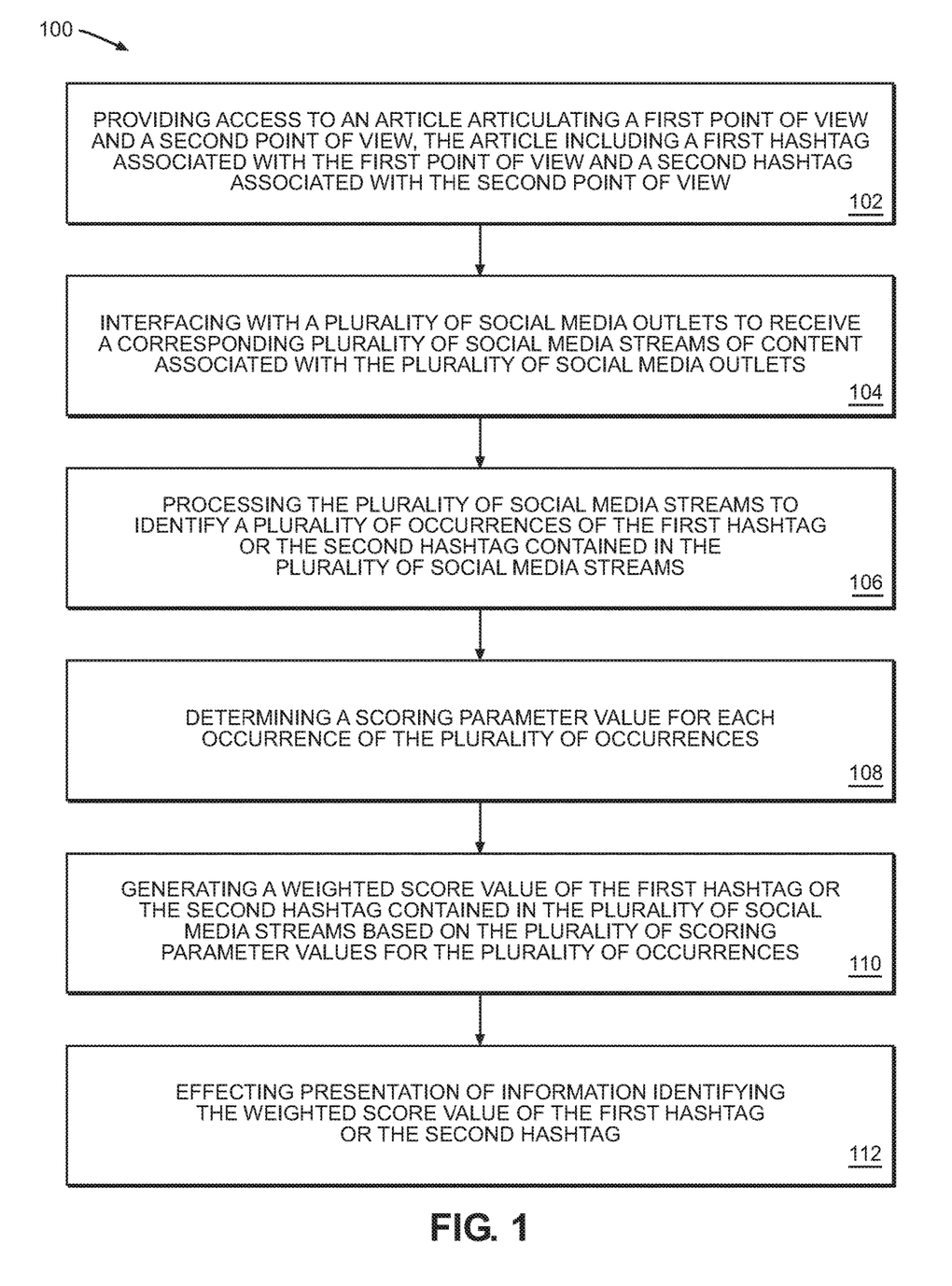
FIG. 1 is a flowchart diagram of a method for providing real-time discovery, analysis, and presentation of perspectives of an article, according to an embodiment.

In this regard, FIG. 1 illustrates a method 100 for providing real-time discovery, analysis, and presentation of perspectives of an article. The method 100 includes providing, by a computing device, access to an article articulating a first point of view associated with a first hashtag, and a second point of view associated with a second hashtag (Block 102). The method 100 further includes interfacing with a plurality of social media outlets to receive a plurality of respective social media streams of content (Block 104). The method 100 further includes processing, by the computing device, the plurality of social media streams to identify occurrences of one or both hashtags contained in the plurality of social media streams (Block 106). The method 100 further includes determining, by the computing device, a scoring parameter value for each of the plurality of occurrences of one or both hashtags (Block 108). The method 100 further includes generating, by the computing device, a weighted score value of one or both hashtags based on the plurality of scoring parameter values for the plurality of occurrences (Block 110). Finally, the method 100 includes effecting presentation of, on a display device, information identifying the weighted score value of one or both hashtags (Block 112). In this manner, a user can view perspectives on an article in real time, based on when and how the different hashtags corresponding to the different perspectives are being utilized on social media.

Figure 2A:
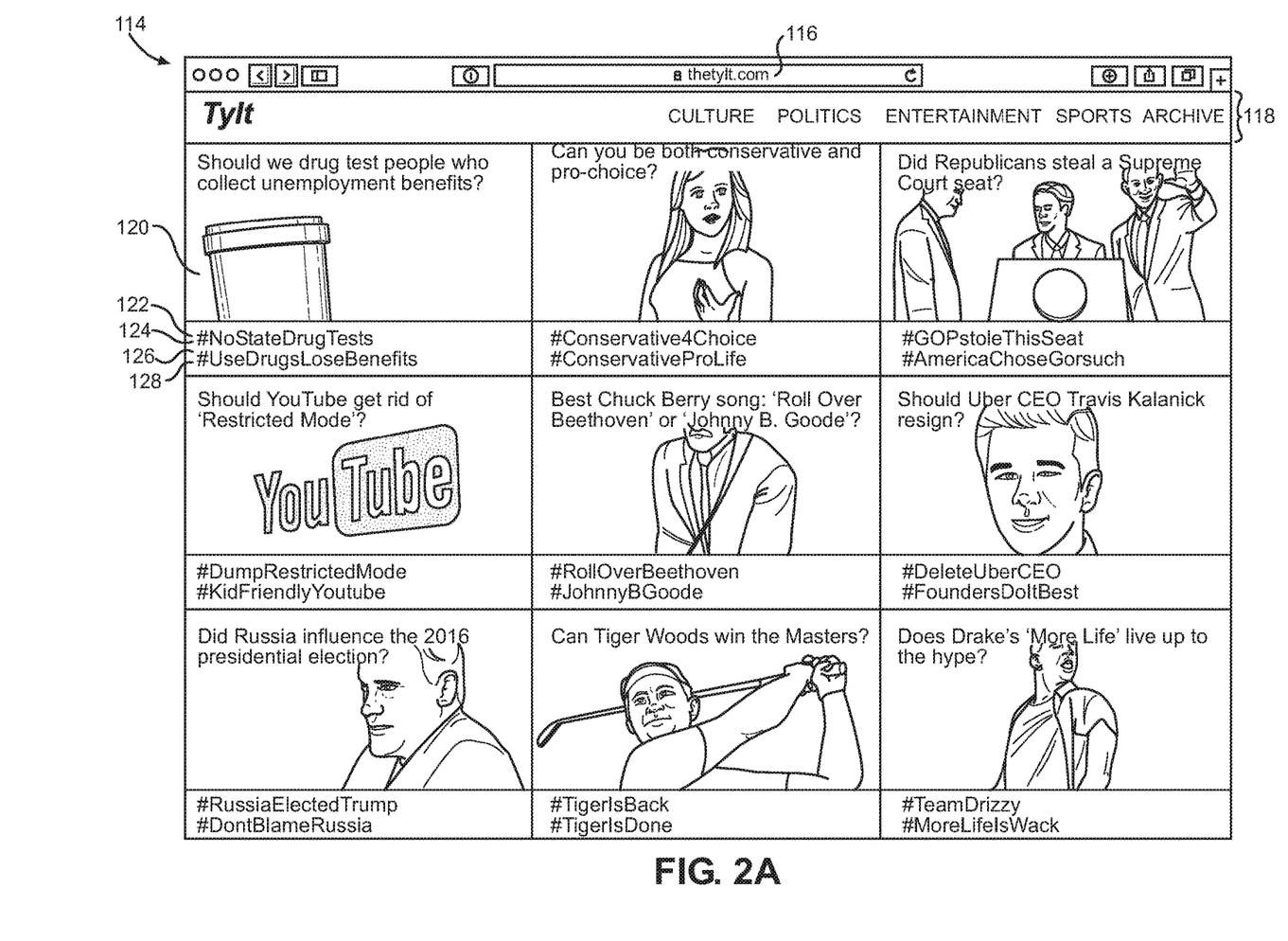
FIGS. 2A and 2B are diagrams of a graphical user interface (GUI) for a webpage for providing articles having a plurality of hashtags associated with a plurality of points of view (POVs), according to an embodiment.
Figure 2B:
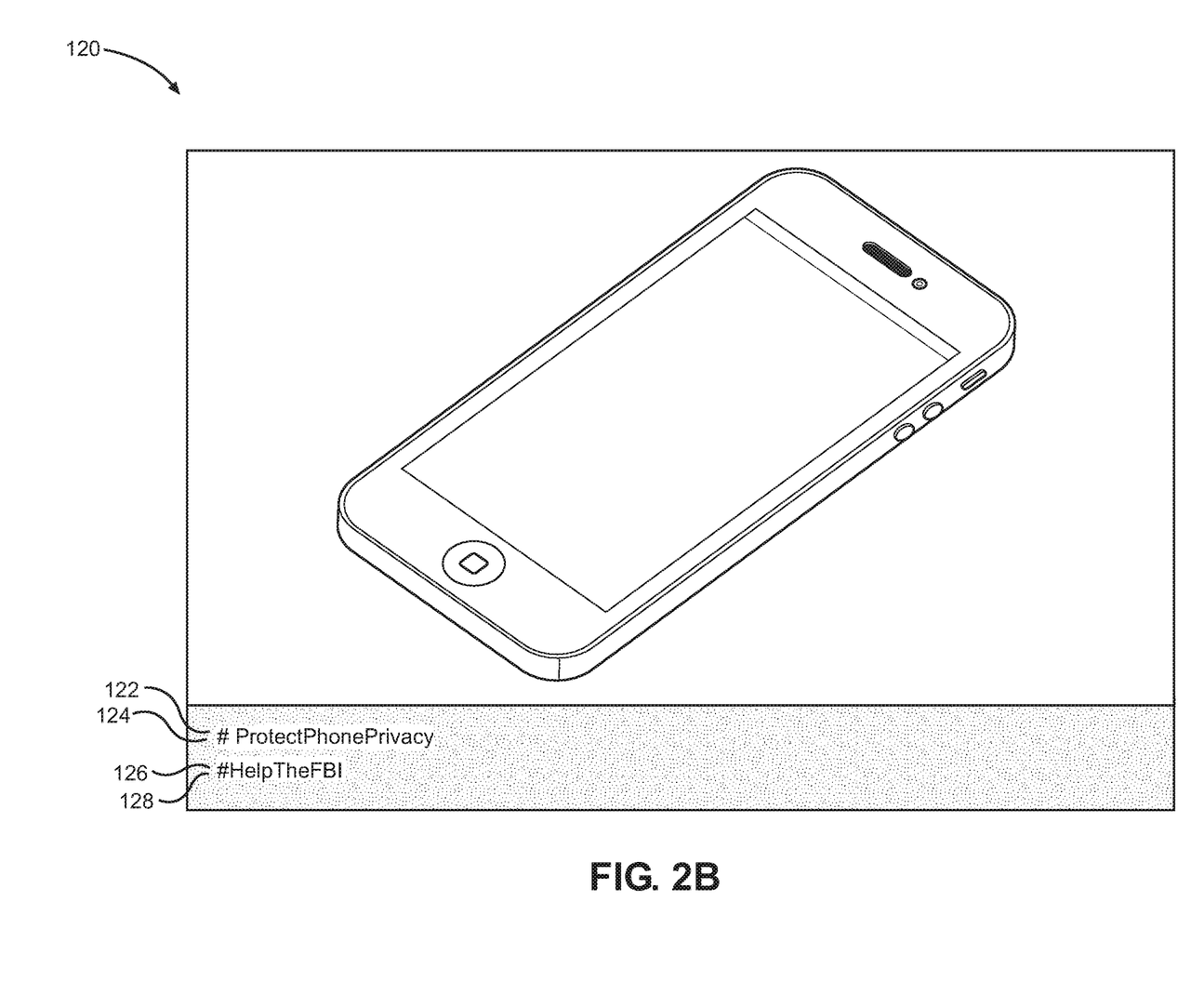

Referring now to FIGS. 2A and 2B, a graphical user interface (GUI) 114 for a system that employs the method of FIG. 1 is illustrated. In particular, FIG. 2A is a graphical depiction of a webpage 116 having a dashboard interface 118 for displaying a plurality of articles 120-1-120-N (generally, articles 120). Each article 120 in this embodiment articulates a first point of view (POV) 122 corresponding to a first hashtag 124 and a second POV 126 corresponding to a second hashtag 128. FIG. 2B illustrates a detailed view of a portion of the webpage 116 relating to a particular article 120. It should be understood that the POVs, hashtags, or other content is provided herein for illustrative purposes only, and does not reflect any opinion associated with the disclosure. In this example, the GUI 114 provides minimal information for each article 120 displayed on the dashboard interface 118, but it should be understood that additional information related to each article 120 may also be displayed in this view.

Figure 3A:
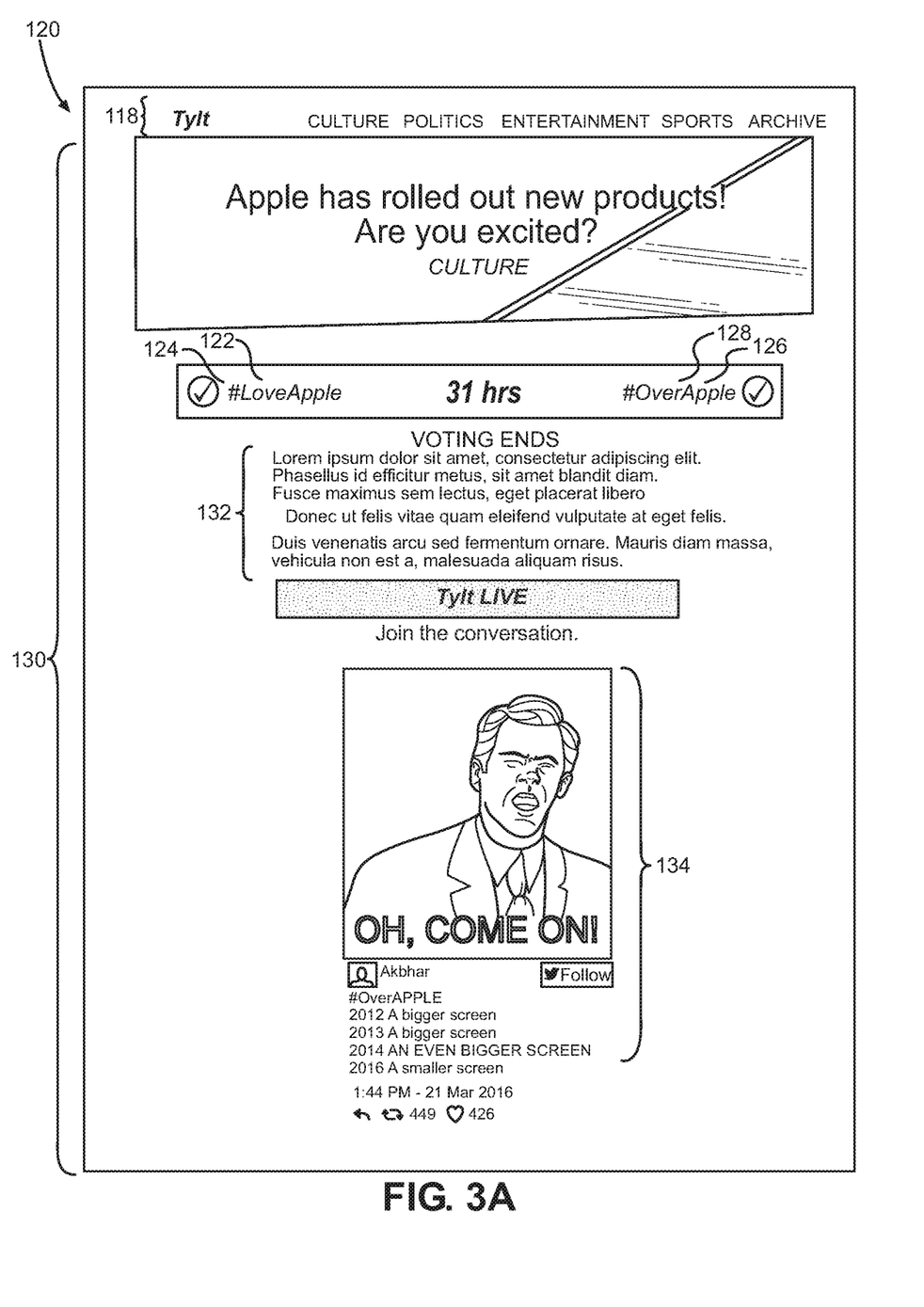
FIGS. 3A and 3B are detailed views of an article having the plurality of hashtags and having visualizations relating to the plurality of hashtags.

Referring now to FIG. 3A, in response to selection of a particular article 120 by a user, an article GUI 130 is displayed, providing additional aspects of the article 120. In this example, the article GUI 130 is another webpage that may be accessed through the dashboard interface 118 via a hyperlink configured to be activated by clicking on the article 120 in the dashboard interface 118. The content of the article 120 may present facts and/or opinion relating to the topic of the article 120, which may articulate one or both of the first POV 122 or the second POV 126. In addition to the article content, the article GUI 130 may also display each of the first hashtag 124 and the second hashtag 128 for selection by the user, and may also provide a timer 132 indicating an amount of time remaining for the user to "weigh in" by selecting one of the first hashtag 124 or the second hashtag 128. The article GUI 130 may also include related social media content 134 displayed in-line with or following the article content. The related social media content 134 may include social media content that utilizes the first hashtag 124 or the second hashtag 128 in some way, and may also include social media content that articulates one or both of the first POV 122 or the second POV 126 in connection with the first hashtag 124 or the second hashtag 128. The related social media content 134 may be selected for display within the article GUI 130 based on one or more selection parameters including, but not limited to, original posting time of the related social media content 134, trending status of the related social media content 134, an identity of the author of the related social media content 134, or other factors.

In FIG. 3A, for example, the article 120 entitled "Apple has rolled out new products! Are you excited?" is presented to a reader. While title of the article 120 refers in this example to new products being introduced by Apple®, it should be understood that the article 120 may refer to any subject, such as newsworthy events, opinions, or analysis. The article 120 in this example includes the first hashtag 124 "# LoveApple," relating to the first POV 122, i.e., interest and/or enthusiasm regarding Apple®'s new products, and the second hashtag 128 "# OverApple," relating to the second POV 126, i.e., disinterest and/or boredom regarding Apple®'s new products. In this example, the first POV 122 and the second POV 126 are mutually exclusive, i.e., one POV precludes the other, but it should be understood that additional and/or different POVs may also be presented, which may not necessarily be mutually exclusive.

In this example, the hashtags 124, 128 are provided in the article 120 as live hyperlinks, which may be selected by the user to indicate approval of the POVs 122, 126 associated with the respective hashtag 124, 128. The hyperlinks associated with the hashtags 124, 128 may also facilitate adding the respective hashtag 124, 128 to a social media posting to be shared on one or more social media outlets by the user. The related social media content 134 in this example includes a Twitter® "tweet," which contains the second hashtag 128, i.e., "# OverApple," along with additional commentary and graphical content. The related social media content 134 may be selected for display as part of the article 120 based on a number of factors, such as popularity of the related social media content 134, popularity and/or influence of the author of the related social media content 134, and/or a posting time of the related social media content 134, for example.

Figure 3B:
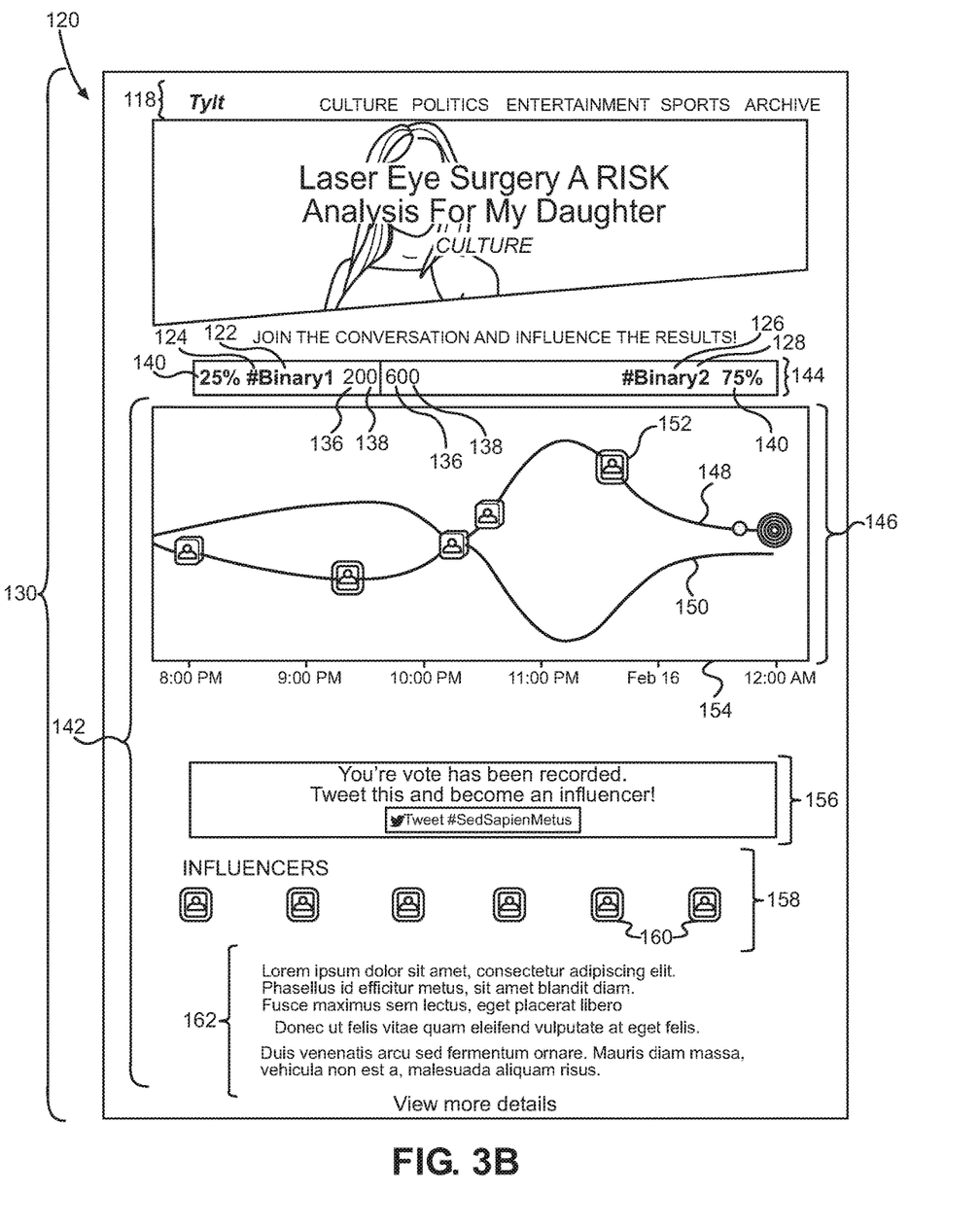

FIG. 3B illustrates another view of the article GUI 130 of an article 120, in which the reader of the article GUI 130 has selected one of the first hashtag 124 or the second hashtag 128. In response to the reader of the article GUI 130 selecting one of the first hashtag 124 or the second hashtag 128, the article GUI 130 presents one or more scoring parameter values 136 associated with one or both of the first hashtag 124 or the second hashtag 128. In this example, the aggregated scoring parameter values 136 are presented as weighted score values 138, representative of tallies of a total number of respective occurrences of the first hashtag 124 and the second hashtag 128. Each weighted score value in this example is a binary value indicative of the presence or absence of a respective occurrence, but it should be understood that the weighted score values may be adjusted or modified based on additional factors, as desired.

The article GUI 130 may also present additional information 140 identifying the weighted score values 138, such as a percentage indicator, a graphical indicator, or another indicator, for example. In this regard, the article GUI 130 of FIG. 3B further illustrates a visualizer GUI 142 for visualizing different aspects of the weighted score values 138 relating to the first hashtag 124 and the second hashtag 128. For example, the visualizer GUI 142 may include an additional graphical indicator 144, i.e., a graphical bar graph, corresponding to the weighted score values 138, i.e., the percentage indicators associated with the first and second hashtags 124, 128. The visualizer GUI 142 may also include a visualizer graph 146 showing changes in the weighted score values 138 over time, with a first plotline 148 corresponding to the first hashtag 124 and a second plotline 150 corresponding to the second hashtag 128 displayed along a horizontal time axis 154. The visualizer GUI 142 may also contain additional information, including graphical representations of individual occurrences 152 associated with particular users, an indication 156 that the reader's vote has been recorded, a subset of influential users 158, which may include profile information 160 or other information for the individual users, and/or additional article content 162, for example.

Figure 4:
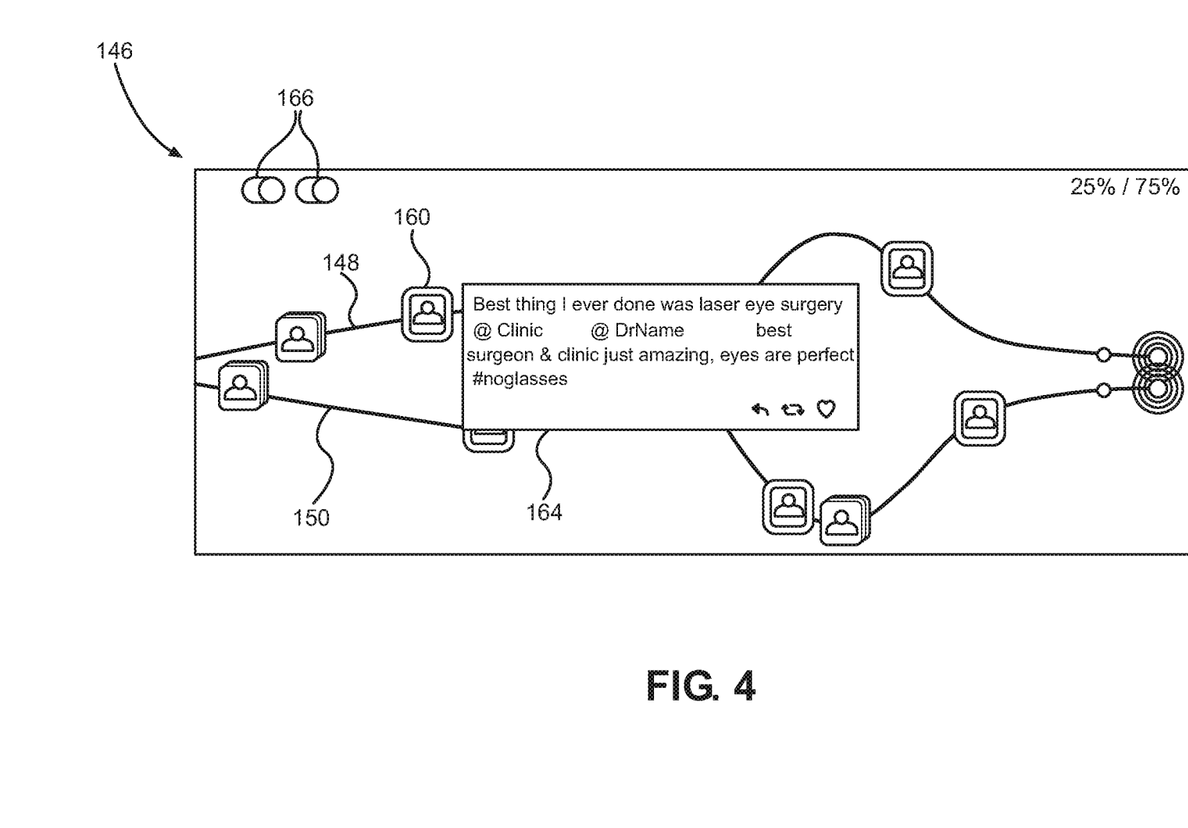
FIG. 4 is a more detailed view of visualizations of the visualizer graph of FIG. 3B.

Referring now to FIG. 4, a more detailed view of the visualizer graph 146 is illustrated. In FIG. 4, the visualizer graph 146 contains a first plotline 148 and second plotline 150 similar to FIG. 3B. In this example, the first and second plotlines 148, 150 are representative of the weighted score values 138 corresponding to the occurrences of each hashtag 124, 128 identified in the social media streams and/or through manual voting. In addition, in this example, additional information 164 may be displayed regarding individual occurrences 152 associated with particular users, such as by selecting the graphical representation of the respective occurrence 152. In this example, by selecting the graphical representation of an occurrence 152 associated with the profile information 160 for a particular influential user, the related social media content 134 associated with the occurrence 152 may be displayed to the reader. The visualizer graph 146 may also include one or more switch elements 166 for adjusting display settings of the visualizer graph 146. For example, the switch elements 166 of FIG. 4 are configured to selectively display or hide the first and second plotlines 148, 150, but it should be understood that additional setting adjustment functions displaying different information with respect to the first and second plotlines 148, 150 may also be provided.

Figure 5A:
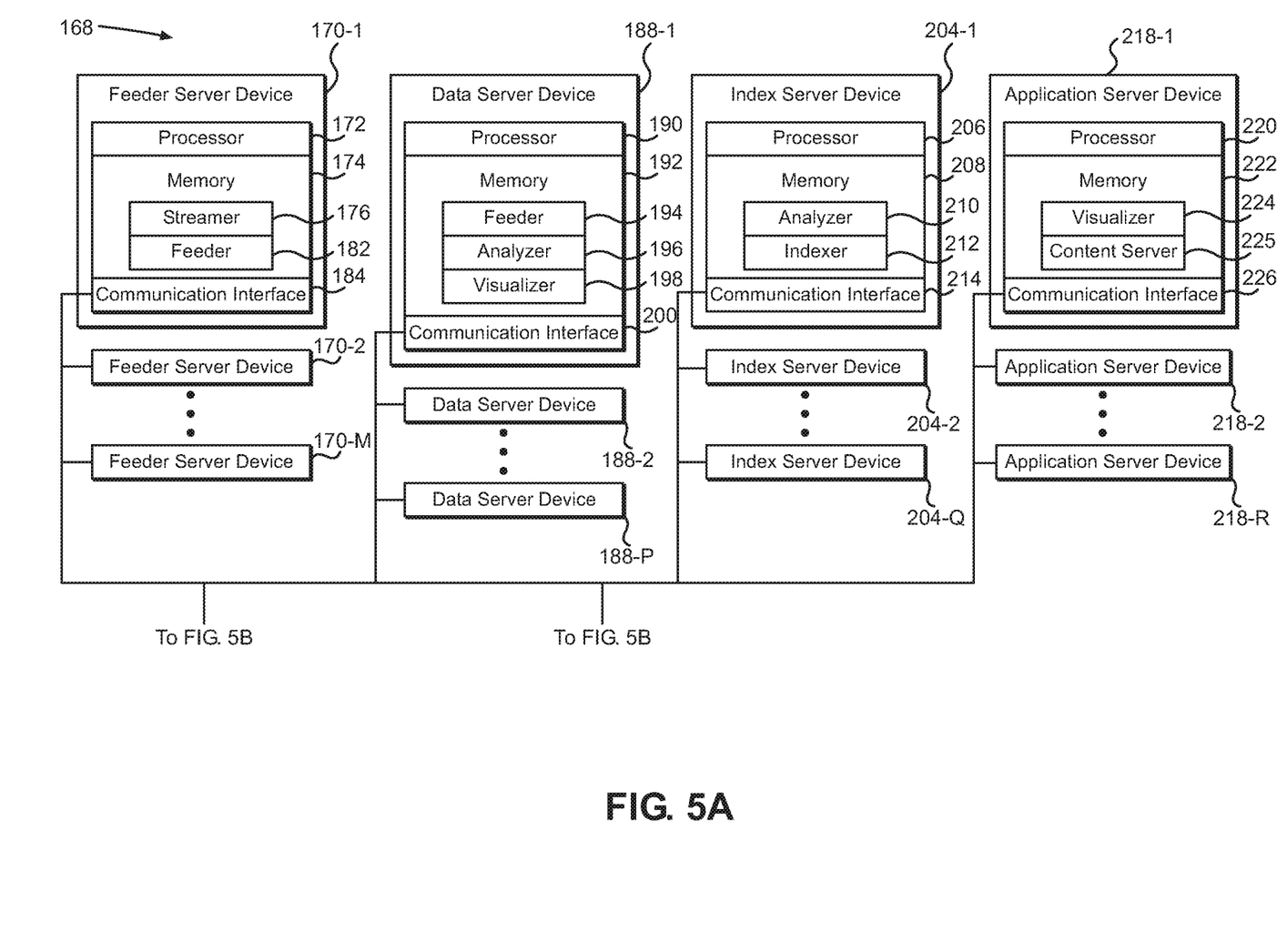
FIGS. 5A and 5B are schematic diagrams of a system suitable for implementing the functionality of various components of different embodiments.
Figure 5B:
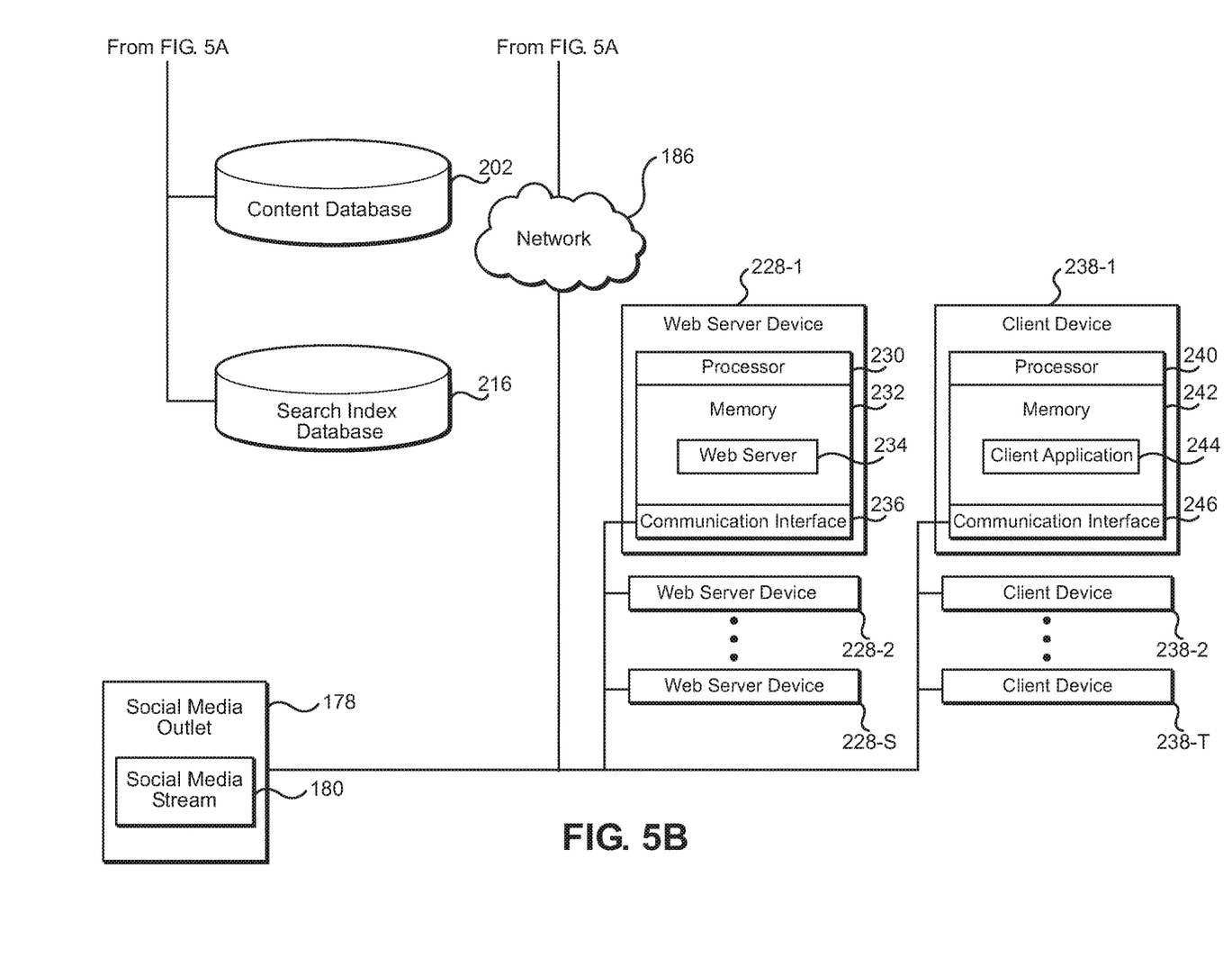

Referring now to FIGS. 5A and 5B, schematic diagrams of related sections of a system 168 are illustrated suitable for implementing the functionality of various components discussed herein. Referring now to FIG. 5A, the system 168 includes one or more feeder server devices 170-1-170-M (generally, feeder server devices 170), each having a processor 172, and a memory 174. The memory 174 includes a streamer 176 configured to interface with one or more social media outlets 178 (FIG. 5B), and more particularly, to receive one or more social media streams 180 (FIG. 5B) associated with each social media outlet 178. The memory 174 also includes a feeder 182 configured to provide a list of active hashtags periodically, or dynamically in real time.

In this embodiment, the streamer 176 is configured to maintain a persistent connection with one or more social media outlets 178 to receive all social media objects relating to the list of active hashtags provided by the feeder 182. In this example, each social media object containing or relating to a particular hashtag provided by the feeder 182 may be referred to as an occurrence of that hashtag. The feeder 182 may also be configured to provide the social media objects from social media streams 180 relevant to the active hashtags for use by other elements of the system 168.

Each feeder server device 170 includes a communication interface 184, which may be directly connected to each other, or which may be indirectly connected to each other via a network 186 (FIG. 5B). The network 186 may be an internal network, e.g., a local area network (LAN) or intranet, or may be an external network, e.g., the Internet in this example. For example, in this embodiment, the system 168 is interconnected using an internal network or intranet, which is connected to the larger network 186, i.e., the Internet. Each streamer 176 is configured to interface with the one or more social media outlets 178 via the network 186 in this example, and each feeder 182 is also configured to fetch the list of active hashtags via the network 186 as well.

To fetch the list of active hashtags, each feeder 182 communicates with one or more data server devices 188-1-188-P (generally, data server devices 188). Each data server device 188 includes a processor 190, and a memory 192. The memory 192 of each data server device 188 includes a feeder 194 configured to communicate with the one or more feeders 182 of the feeder server devices 170 to provide a dynamically updated list of active hashtags for use by the feeder server devices 170, and to receive the social media objects from the feeder server devices 170.

In this example, the social media streams 180 may be received by the feeders 182 from the social media outlets 178 using a particular social media application program interface (API). For many social media outlets 178, such as Facebook®, Twitter®, etc., the social media API can enable access to social media objects including text, photos, video, gifs, polls, live video, hashtags, and/or links to outside content, for example. This content is generally created by some or all users on these platforms to share with their social connections and/or the public. The social media APIs that are made available by many social media outlets 178 therefore provide real-time streaming access to this content, but existing social media APIs do not provide a way to analyze the user-generated content that streams through them in real time.

Because existing social media APIs do not provide this functionality, the memory 192 of each data server device 188 also includes an analyzer 196 configured to analyze the social media objects in order to determine a scoring parameter value for each social media object and associate the scoring parameter value with a hashtag contained by or relating to the social media object. The memory 192 of each data server device 188 may also include a visualizer 198, configured to provide information relating to the scoring parameter values for different hashtags for display in a variety of display formats. The visualizer 198 may be similar to the visualizer GUI 142 described above with respect to FIGS. 3B-4, but it should be understood that the visualizer 198 is not so limited.

Each data server device 188 includes a communication interface 200, which may be directly connected to each other communication interface 200, or which may be indirectly connected to each other communication interface 200 via the network 186. Each data server device 188 in this embodiment is configured to communicate via the network 186 with each feeder server device 170 and may also communicate with a standalone content database 202 (FIG. 5B). The content database 202 in this example is configured to receive, store, and provide information relating to the social media objects from the plurality of social media streams 180 and the associated scoring parameter values of the social media objects. In this example, the content database 202 is configured to store voting histories of users, behavioral data (i.e., what users have read), ad targeting data, geographic data, social sharing, influence status, publicly available social data, etc.

The system 168 maintains a persistent, real-time connection to the social media APIs for each social media outlet 178 via the feeder 182 and/or feeder 194 in order to access the social media stream 180 of all of the publicly available and/or authorized user-generated content associated with the various hashtags 124, 128 for each article 120. The analyzer 196 identifies occurrences of either hashtag 124, 128 in the social media content, e.g., text, photos, video, gifs, polls, live video, and/or links to outside content.

The system 168 further includes one or more index server devices 204-1-204-Q (generally, index server devices 204), each having a processor 206, and a memory 208. The memory 208 of each index server device 204 includes an analyzer 210 configured to communicate with the one or more analyzers 196 of the one or more data server device 188 to index the social media objects in order to determine a scoring parameter value for each social media object and associate the scoring parameter value with a hashtag contained by or relating to the social media object. The memory 208 of each index server device 204 may also include an indexer 212 configured to index information relating to the social media objects from the plurality of social media streams 180 and the associated scoring parameter values of the social media objects. This indexed information may include, for example, a name, a screen name, a location, a description, a shared URL, a privacy status (i.e., whether their account is publicly accessible or private), a total number of followers, a total number of users followed, a total number of friends, a listed count, a favorites count, a UTC offset, a time zone, a geo enablement, a verification status, a total number of historical posts, a language, contributors, profile images, and/or a background image associated with the user and/or a social media object containing the occurrence of the hashtag 124, 128. This indexed information may be used by the index server device 204 or by other components of the system 168 for searching for individual hashtags, social media objects, or other content or information.

Each index server device 204 includes a communication interface 214, which may be directly connected to each other communication interface 214, or which may be indirectly connected to each other communication interface 214 via the network 186. Each index server device 204 in this embodiment is configured to communicate via the network 186 with each data server device 188 and may also communicate with a standalone search index database 216 (FIG. 5B) to store information relating to searching for individual hashtags, social media objects, or other content or information. The search index database 216 may also obtain information from or share information with content database 202.

In this example, one or both of the analyzers 196, 210 of the data server devices 188 and index server devices 204 compare each individual occurrence of a hashtag 124, 128 to all other occurrences, all other instances of the opposing hashtag 124, 128, and the total counts of manual votes for either hashtag 124, 128 and calculate the total raw count for either opinion. For example, if there are 500 social votes for the first hashtag 124, 500 manual votes for the first hashtag 124, 500 social votes for the opposing second hashtag 128, and 500 manual votes for the second hashtag 128, the total raw count returned in real time would be 1,000 votes for the first hashtag 124 and 1000 votes for the second hashtag 128. The analyzer 196 calculates the percentage of users who agree with each hashtag 124, 128, to generate the weighted score value 138 for each hashtag 124, 128.

As part of indexing the information relating to the social media objects from the plurality of social media streams 180, and the associated scoring parameter values of the social media objects, the indexer 212 may also dynamically update, in real time, received information relating to each user associated with a particular occurrence of a hashtag 124, 128. This information may include, for example, a name, a screen name, a location, a description, a shared URL, a privacy status (i.e., whether their account is publicly accessible or private), a total number of followers, a total number of users followed, a total number of friends, a listed count, a favorites count, a UTC offset, a time zone, a geo enablement, a verification status, a total number of historical posts, a language, contributors, profile images, and/or a background image for the particular user.

The analyzer 210 uses this information to determine an influence parameter value for the user, and may also provide a rank parameter value for the user based on the influence parameter value, indicating a ranking of the user in relation to other users. The influence parameter value and rank parameter value for each user, as well as the weighted scoring parameter value for each hashtag 124, 128, may be updated in real time based on a number of factors, including volume of voting activity, which may affect a window of time used for determining the influence parameter values, rank parameter values, and/or weighted scoring parameter value. In this example, the social media streams may be iteratively processed to identify occurrences of the first hashtag 124 or the second hashtag 128 contained in the plurality of social media streams over a predetermined period of time, in real time. The ratio of the occurrences of the first hashtag 124 to the second hashtag 128 may also be iteratively displayed over the predetermined period of time.

In addition to this dynamic determination and presentation of weighted scoring parameter values, an editorial user or team associated with the system 168 may also interact with the components of the system to supplement the functionality provided therein. For example, the editorial user or team may compose or update articles that include text, photos, videos, GIFs and/or user generated content, which may include new or additional hashtags. The editorial user or team may also manually update a user's influence parameter value and rank parameter value, as desired.

The visualizer 198 of a data server device 188 next provides information relating to the weighted scoring parameter values to one or more application server devices 218-1-218-R (generally, application server devices 218), each having a processor 220 and a memory 222. Each memory 222 of the one or more application server devices 218 may include a visualizer 224 configured to communicate with the one or more visualizers 198 of the one or more data server devices 188 to provide information relating to the scoring parameter values for different hashtags for display in a variety of display formats. Each memory 222 of the one or more application server devices 218 may also include a content server 225 configured to provide access to the article content, which may include the scoring parameter values for different hashtags for display in a variety of display formats.

Each application server device 218 includes a communication interface 226, which may be directly connected to each other communication interface 226, or which may be indirectly connected to each other communication interface 226 via the network 186. Each index server device 204 in this embodiment is configured to communicate via the network 186 with each data server device 188 to provide and/or process data for delivery over the network 186.

Referring now to FIG. 5B, system 168 further includes one or more web server devices 228-1-228-S (generally, web server devices 228), each having a processor 230 and a memory 232. Each memory 232 of the one or more web server devices 228 may include a web server 234 configured to communicate with the one or more visualizers 224 of the one or more application server devices 218 to provide information relating to the scoring parameter values for different hashtags for display in a variety of display formats, for example, as part of a web page such as the webpage 116 discussed in detail above.

Each web server device 228 includes a communication interface 236, which may be directly connected to each other communication interface 236, or which may be indirectly connected to each other communication interface 236 via the network 186. Each web server device 228 in this embodiment is configured to communicate via the network 186 with each application server device 218 to provide and/or process data for delivery over the network 186.

The system 168 is further configured to communicate with one or more client devices 238-1-238-T (generally, client devices 238), each having a processor 240 and a memory 242. Each memory 242 of the one or more client devices 238 may include one or more client applications 244, such as a web browser for example, configured to communicate with the one or more visualizers 224 of the one or more application server devices 218 to provide information relating to the scoring parameter values for different hashtags for display in a variety of display formats, for example, as part of a web page such as the webpage 116 discussed in detail above.

Each web server device 228 includes a communication interface 246, which may be directly connected to each other communication interface 246, or which may be indirectly connected to each other communication interface 246 via the network 186. Each client device 238 in this embodiment is configured to communicate via the network 186 with one or more web server devices 228 to request and/or receive real-time visualization data over the network 186.

Figure 6:
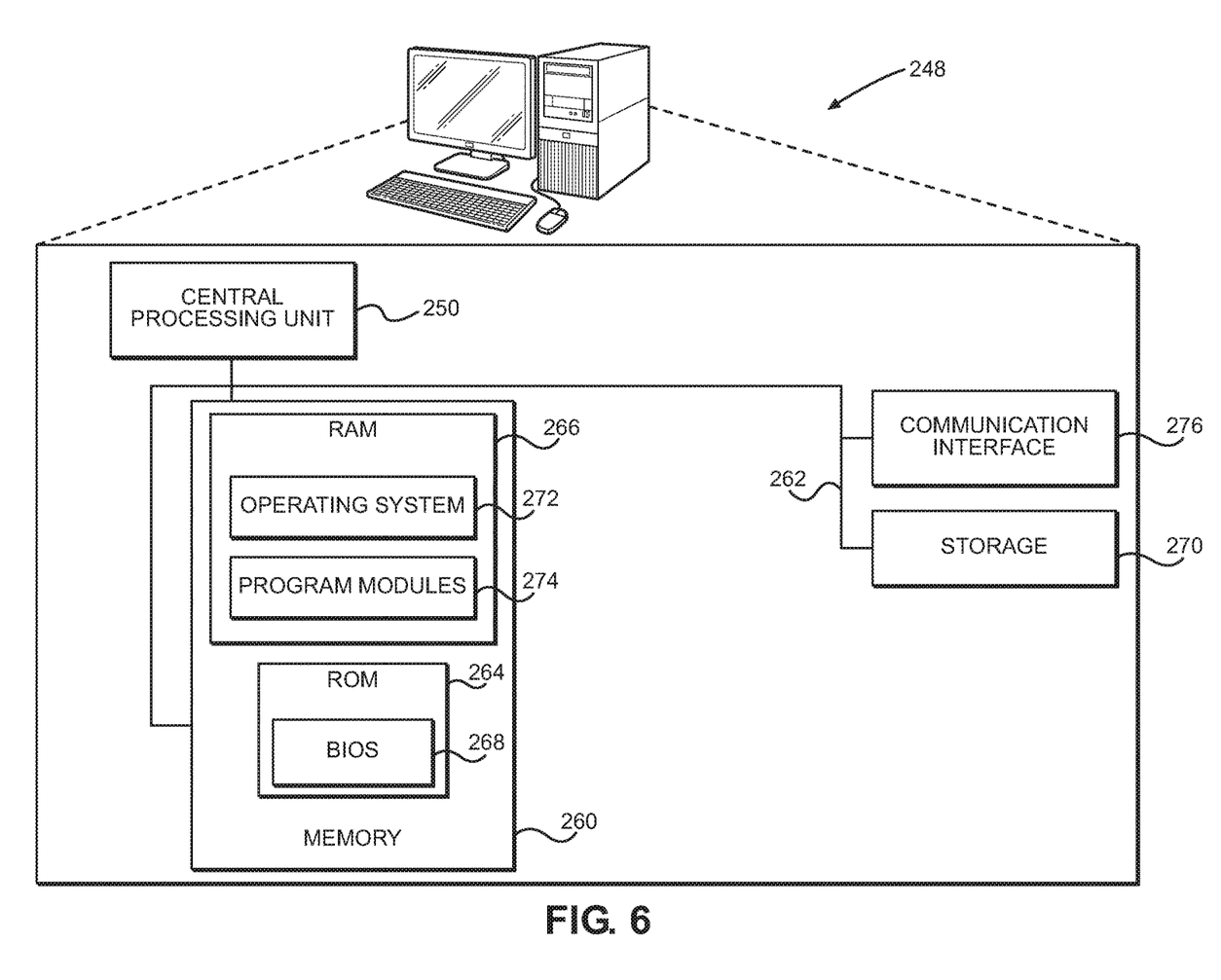
FIG. 6 is a block diagram of a computing device suitable for implementing functionality described herein.

FIG. 6 is a block diagram of a computing device 248 suitable for implementing the functionality of various components discussed herein, including, for example, the components of the feeder server devices 170, the data server devices 188, the index server devices 204, the application server devices 218, the web server devices 228, and/or the client devices 238. In some embodiments, such components may be implemented on separate computing devices 248. In other embodiments, certain of the components may be implemented on a single computing device 248. For example, in some embodiments, the functionality of the feeder server devices 170, the data server devices 188, the index server devices 204, the application server devices 218, and/or the web server devices 228 may be implemented on a fewer number of computing devices 248, or on a single computing device 248. These are merely examples, and the particular implementation of functionality versus individual computing devices may be system and design dependent.

The computing device 248 may comprise any computing or processing device capable of including firmware, hardware, and/or executing software instructions to implement the functionality described herein for the respective component. The computing device 248 includes a central processing unit 250, sometimes referred to as a processor or micro-processor, a system memory 260, and a system bus 262. The system bus 262 provides an interface for system components including, but not limited to, the system memory 260 and the central processing unit 250. The central processing unit 250 can be any commercially available or proprietary processor.

The system bus 262 may be any of several types of bus structures that may further interconnect to a memory bus (with or without a memory controller), a peripheral bus, and/or a local bus using any of a variety of commercially available bus architectures. The system memory 260 may include non-volatile memory 264 (e.g., read only memory (ROM), erasable programmable read only memory (EPROM), electrically erasable programmable read only memory (EEPROM), etc.) and/or volatile memory 266 (e.g., random access memory (RAM)). A basic input/output system (BIOS) 268 may be stored in the non-volatile memory 264, and can include the basic routines that help to transfer information between elements within the computing device 248. The volatile memory 266 may also include a high-speed RAM, such as static RAM for caching data.

The computing device 248 may further include or be coupled to a computer-readable storage 270, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The computer-readable storage 270 and other drives, associated with computer-readable media and computer-usable media, may provide non-volatile storage of data, such as the visualizer graph 146, computer-executable instructions, and the like. Although the description of computer-readable media above refers to an HDD, it should be appreciated by those skilled in the art that other types of media which are readable by a computer, such as a solid state drives (SSD), floppy disks, magnetic cassettes, flash memory drives, flash memory cards, cartridges, optical media, and the like, may also be used in the exemplary operating environment, and further, that any such media may contain computer-executable instructions for performing novel methods of the disclosed architecture.

A number of modules can be stored in the computer-readable storage 270 and in the volatile memory 266, including an operating system 272 and one or more program modules 274, which may implement the functionality described herein in whole or in part, including, for example, the ability to receive and analyze the social media content, and provide the visualizer graph 146 based on the social media content.

All or a portion of the embodiments may be implemented as a computer program product stored on a transitory or non-transitory computer-usable or computer-readable storage medium, such as the computer-readable storage 270, which includes complex programming instructions, such as complex computer-readable program code, configured to cause the central processing unit 250 to carry out the steps described herein. Thus, the computer-readable program code can comprise software instructions for implementing the functionality of the embodiments described herein when executed on the central processing unit 250. The central processing unit 250, in conjunction with the program modules 274 in the volatile memory 266, may serve as a controller, or control system, for the computing device 248 that is configured to, or adapted to, implement the functionality described herein. The computing device 248 may also include a communication interface 276, suitable for communicating directly with other computing devices, with the network 186, and with other networks as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   providing, by a computing device, access to an article articulating a first point of view and a second point of view, the article including a first hashtag associated with the first point of view and a second hashtag associated with the second point of view;
   receiving, from a plurality of social media outlets a corresponding plurality of social media streams of content associated with the plurality of social media outlets, the social media streams comprising content generated by users of the respective social media outlets;
   analyzing, by the computing device, the plurality of social media streams to identify a plurality of occurrences of the first hashtag or the second hashtag contained in the plurality of social media streams;
   determining, by the computing device, a scoring parameter value for each occurrence of the plurality of occurrences;
   generating, by the computing device, a weighted score value of the first hashtag or a weighted score value of the second hashtag contained in the plurality of social media streams based on the plurality of scoring parameter values for the plurality of occurrences; and
   effecting presentation of, on a display device, information identifying the weighted score value of the first hashtag or the weighted score value of the second hashtag.

2. The method of claim 1 wherein the scoring parameter value for each occurrence is a binary value representative of the occurrence of the first hashtag or the second hashtag contained in the plurality of social media streams,
   wherein generating, by the computing device, the weighted score value of the first hashtag or the weighted score value of the second hashtag contained in the plurality of social media streams comprises tallying the scoring parameter values for the plurality of occurrences of the first hashtag or the second hashtag.

3. The method of claim 1, further comprising:
   identifying a plurality of sources of the plurality of occurrences of the first hashtag or the second hashtag contained in the plurality of social media streams; and
   determining, by the computing device, a rank parameter value for each of the plurality of sources,
   wherein generating, by the computing device, the weighted score value of the first hashtag or the weighted score value of the second hashtag contained in the plurality of social media streams further comprises generating the weighted score value of the first hashtag or the weighted score value of the second hashtag based on a rank parameter value for each source of a subset of the plurality of sources.

4. The method of claim 3, wherein effecting presentation of, on the display device, information identifying the weighted score value of the first hashtag or the weighted score value of the second hashtag further comprises effecting presentation of, on the display device, information identifying at least some of the sources having the highest rank parameter values of the plurality of sources.

5. The method of claim 4, wherein identifying the plurality of sources comprises identifying, for each source of the plurality of sources, one or more of a name, a screen name, a location, a description, a shared Uniform Resource Locator (URL), a privacy status, a total number of followers, a total number of users followed, a total number of friends, a listed count, a favorites count, a Coordinated Universal Time (UTC) offset, a time zone, a geo enablement, a verification status, a total number of historical posts, a language, a contributor, a profile image, or a background image.

6. The method of claim 4, wherein effecting presentation of, on the display device, information identifying the weighted score value of the first hashtag or the weighted score value of the second hashtag further comprises effecting presentation of, on the display device, information depicting profile images of the at least some of the sources having the highest rank parameter values of the plurality of sources.

7. The method of claim 6, wherein effecting presentation of, on the display device, information identifying the weighted score value of the first hashtag or the weighted score value of the second hashtag further comprises effecting the presentation of, on the display device, content generated by the at least some of the sources.

8. The method of claim 1, further comprising:
iteratively processing, by the computing device, the plurality of social media streams to identify the plurality of occurrences of the first hashtag or the second hashtag contained in the plurality of social media streams over a period of time; and
iteratively effecting presentation of a ratio of occurrences of the first hashtag to the second hashtag over the period of time.

9. The method of claim 1 further comprising:
providing the first hashtag and the second hashtag in conjunction with the article, the first hashtag and the second hashtag being user selectable; and
receiving, by the computing device, a plurality of selections of the first hashtag and the second hashtag from a plurality of different users, the plurality of selections of the first hashtag and the second hashtag being included in the plurality of occurrences of the first hashtag and the second hashtag.

10. A computing device comprising:
a communications interface configured to communicate with a network; and
a processor device coupled to the communications interface and configured to:
provide access to an article articulating a first point of view and a second point of view, the article including a first hashtag associated with the first point of view and a second hashtag associated with the second point of view;
receive from a plurality of social media outlets a corresponding plurality of social media streams of content associated with the plurality of social media outlets, the social media streams comprising content generated by users of the respective social media outlets;
analyze the plurality of social media streams to identify a plurality of occurrences of the first hashtag or the second hashtag contained in the plurality of social media streams;
determine a scoring parameter value for each occurrence of the plurality of occurrences;
generate a weighted score value of the first hashtag or a weighted score value of the second hashtag contained in the plurality of social media streams based on the plurality of scoring parameter values for the plurality of occurrences; and
effect presentation of, on a display device, information identifying the weighted score value of the first hashtag or the weighted score value of the second hashtag.

11. The computing device of claim 10, wherein the scoring parameter value for each occurrence is a binary value representative of the occurrence of the first hashtag or the second hashtag contained in the plurality of social media streams,
wherein generating, by the processor device, the weighted score value of the first hashtag or the weighted score value of the second hashtag contained in the plurality of social media streams comprises tallying the scoring parameter values for the plurality of occurrences of the first hashtag or the second hashtag.

12. The computing device of claim 10, wherein the processor device is further configured to:
identify a plurality of sources of the plurality of occurrences of the first hashtag or the second hashtag contained in the plurality of social media streams; and
determine a rank parameter value for each of the plurality of sources,
wherein generating the weighted score value of the first hashtag or the weighted score value of the second hashtag contained in the plurality of social media streams further comprises generating the weighted score value of the first hashtag or the weighted score value of the second hashtag based on a rank parameter value for each source of a subset of the plurality of sources.

13. The computing device of claim 12, wherein effecting presentation of, on the display device, information identifying the weighted score value of the first hashtag or the weighted score value of the second hashtag further comprises effecting presentation of, on the display device, information identifying at least some of the sources having the highest rank parameter values of the plurality of sources.

14. The computing device of claim 13, wherein identifying the plurality of sources comprises identifying, for each source of the plurality of sources, one or more of a name, a screen name, a location, a description, a shared Uniform Resource Locator (URL), a privacy status, a total number of followers, a total number of users followed, a total number of friends, a listed count, a favorites count, a Coordinated Universal Time (UTC) offset, a time zone, a geo enablement, a verification status, a total number of historical posts, a language, a contributor, a profile image, or a background image.

15. The computing device of claim 13, further comprising the display device, wherein effecting presentation of, on the display device, information identifying the weighted score value of the first hashtag or the weighted score value of the second hashtag further comprises effecting presentation of, on the display device, information depicting profile images of the at least some of the sources having the highest rank parameter values of the plurality of sources.

16. The computing device of claim 15, wherein effecting presentation of, on the display device, information identifying the weighted score value of the first hashtag or the weighted score value of the second hashtag further comprises effecting the presentation of, on the display device, content generated by the at least some of the sources.

17. The computing device of claim 10, wherein the processor device is further configured to:
  iteratively process the plurality of social media streams to identify the plurality of occurrences of the first hashtag or the second hashtag contained in the plurality of social media streams over a period of time; and
  iteratively effect presentation of a ratio of occurrences of the first hashtag to the second hashtag over the period of time.

18. The computing device of claim 10, wherein the processor device is further configured to:
  provide the first hashtag and the second hashtag in conjunction with the article, the first hashtag and the second hashtag being user selectable; and
  receive a plurality of selections of the first hashtag and the second hashtag from a plurality of different users, the plurality of selections of the first hashtag and the second hashtag being included in the plurality of occurrences of the first hashtag and the second hashtag.

19. A non-transitory computer readable medium comprising machine readable instructions configured to cause a processor device to:
  provide access to an article articulating a first point of view and a second point of view, the article including a first hashtag associated with the first point of view and a second hashtag associated with the second point of view;
  receive from a plurality of social media outlets a corresponding plurality of social media streams of content associated with the plurality of social media outlets, the social media streams comprising content generated by users of the respective social media outlets;
  analyze the plurality of social media streams to identify a plurality of occurrences of the first hashtag or the second hashtag contained in the plurality of social media streams;
  determine a scoring parameter value for each occurrence of the plurality of occurrences;
  generate a weighted score value of the first hashtag or a weighted score value of the second hashtag contained in the plurality of social media streams based on the plurality of scoring parameter values for the plurality of occurrences; and
  effect presentation of, on a display device, information identifying the weighted score value of the first hashtag or the weighted score value of the second hashtag.

20. The non-transitory computer readable medium of claim 19, wherein the scoring parameter value for each occurrence is a binary value representative of the occurrence of the first hashtag or the second hashtag contained in the plurality of social media streams,
  wherein generating the weighted score value of the first hashtag or the weighted score value of the second hashtag contained in the plurality of social media streams comprises tallying the scoring parameter values for the plurality of occurrences of the first hashtag or the second hashtag.

21. The non-transitory computer readable medium of claim 19, the machine readable instructions further configured to cause the processor device to:
  identify a plurality of sources of the plurality of occurrences of the first hashtag or the second hashtag contained in the plurality of social media streams; and
  determine a rank parameter value for each of the plurality of sources,
  wherein generating the weighted score value of the first hashtag or the second hashtag contained in the plurality of social media streams further comprises generating the weighted score value based on a rank parameter value for each source of a subset of the plurality of sources.

\* \* \* \* \*